UNITED STATES PATENT OFFICE.

ADAM YOUNG BLOMELEY AND RALPH EDWIN HOMER BLOMELEY, OF NEW YORK, N. Y.

PROCESS OF PURIFICATION AND FILTRATION OF LIQUIDS.

1,404,185. Specification of Letters Patent. Patented Jan. 24, 1922.

No Drawing. Application filed October 18, 1919. Serial No. 331,592.

*To all whom it may concern:*

Be it known that we, ADAM YOUNG BLOMELEY and RALPH EDWIN HOMER BLOMELEY, citizens of Canada, residing in the city of New York and State of New York, have invented certain new and useful Improvements in Processes of Purification and Filtration of Liquids, of which the following is a specification.

The invention relates to a process of separation of impurities from liquids, and in certain features it relates more particularly to a process of making sugar, and more especially to a process for removing impurities from juices and syrups during the manufacture of sugar.

Objects and advantages of the invention will be set out in part hereinafter, and in part will be obvious herefrom, or may be learned by practicing the invention; the same being realized and attained through the steps set out in the appended claims.

The invention consists in the novel steps, succession or sequence of steps, and processes herein set forth and described.

In the application of our process set forth herein by way of example and explanation, it will be described as applied to the purification of sugar juices, and solutions, although it will be understood that in its broader aspects the invention has a wider application.

In the manufacture of sugar it is essential that the impurities be removed from the juice, solution, or syrup, and to secure a first-class product that such impurities be removed very thoroughly and substantially entirely, leaving a practically pure juice, solution or syrup for the production of the sugar. It is also essential or highly advantageous that such removal of the impurities be effected easily and expeditiously, to facilitate and expedite the manufacture and to reduce the cost thereof.

The present process is directed to the ends stated, and effects a very thorough segregation and collection of the impurities and also acts to expedite and render more efficient the filtration of the juice and syrup. In certain of its features the invention as stated is applicable to the purification or refining of other substances than sugar juices or syrups, such as oils and like substances.

The main object of the invention is to facilitate the filtration of solutions or fluids containing suspended mechanical organic or inorganic impurities, which are either natural to such solutions or fluids, or are produced therein by chemical combination or added reagents, or by coagulation under heat, the removal of which impurities is necessary in the further preparation and manufacture of the solutions or fluids or the substances derived therefrom. Such fluids and solutions comprise the juices of sugar cane and sugar beets, raw sugars, liquors and syrups, and vegetable and mineral oils and the like.

Referring more in detail to the present preferred form or manner of practicing the invention, we have discovered that certain anhydrous bi-silicates or other silicates of the amphibole and pyroxene groups, a physical characteristic of which is their unctuous properties, when their fibrous or like structure is disintegrated and the substance is finely comminuted, or otherwise finely divided, and the resultant material is diffused or mixed through a juice, solution or other liquid, suspended impurities are thoroughly collected or gathered together and the subsequent easy and rapid flow of the so purified liquid through the filtering medium, such as presses or bags, is effected or greatly facilitated.

The comminuted or ground substances described have the physical property of possessing an exceedingly strong or marked affinity for attracting and holding or absorbing by molecular, capillary or surface attraction colloidal matter and albuminous precipitates, and other suspended impurities of a viscous or gummy nature. That is, the material is capable of attracting all kinds of impurities, and of gathering or absorbing exceedingly large relative quantities of all such impurities. This includes not only the impurities already generally referred to, but also the very minute colloidal or albuminous substances which ordinarily pass through the filters and cloud the filtered liquid. This property and action is enhanced or intensified by the thorough and complete suspension in and pervasion of the fluid or solution by the comminuted impurity collecting substance.

These substances have in addition to the foregoing, the further property of retaining the impurities so attracted and thereby separated from independent flotation in the juice, solution or other liquid, and by such relatively permanent holding or attraction, they prevent these impurities from passing into contact with and consequently clogging the filtering elements or media, such as presses, bags and the like. In addition to the foregoing, these substances gather and hold the very minute impurities which commonly remain in suspension in the liquid, pass through the filter bags or screens, and cloud the syrup or other purified liquid.

A substance of the general kind described which is available and also very efficacious is asbestos. The fibrous asbestos is finely ground or otherwise adequately comminuted and is thoroughly mixed into the solution or other liquid prior to filtration thereof, the detailed practice being described hereinafter as especially applied to sugar manufacture.

In the manufacture of sugar from cane as usually practiced, the juice is expressed from the cane, and the raw juice is heated to coagulate the albuminoids and certain other impurities. These with some of the lighter mechanical impurities form a scum on the surface of the liquid and the heavier impurities settle or are precipitated to the bottom, and are usually known as "mud."

In many cases the clear juice intervening between the scum and mud is decanted preparatory to evaporation and concentration, while the other impurities are separated and usually filtered. In many cases, the entire liquid is filtered by mechanical filtration. In certain cases the scum is skimmed or removed by some substantially equivalent process.

In our process, that part of the juice which is to be purified, whether the entire quantity or a portion thereof, has mixed with it the comminuted or ground asbestos. The finely divided asbestos is thoroughly mixed into the liquid in any suitable manner, as by mechanical stirring, by boiling of the liquid, or by putting in the asbestos and mixing by air action. Such mixing in of the divided asbestos may be coincident with, or prior or subsequent to the usual liming and acidifying of the juice.

The various impurities in the juice have a very strong affinity for the finely divided asbestos, and the divided state of the latter permits it to permeate or pervade all parts of the liquid. As a result, the impurities are collected by and remain adherent upon the minute particles of asbestos, both such impurities as would be separated by the filters and such as would pass therethrough and later would cloud the syrup or other purified liquid.

The minute particles of asbestos are small and light, and after the cleansing of the liquid by the gathering of the impurities in suspension therein by the asbestos during the stirring or other agitation already described, the particles will mostly rise to the surface and form a part of the easily removable scum. Thus the finely divided asbestos may be used as a purifying agent or medium where the scum is removed without filtration.

The usual process of purification is by filtration, and preferably by filtration of all of the juice or other liquid. This process is usually much impeded and somewhat impaired by the clogging of the filter cloths, screens or other media, especially by certain viscous, gummy and other impurities which act to cover or seal the interstices in the filtering media through which the liquid passes. By reason of the affinity of these viscous and like impurities for the finely divided asbestos, they are held back from attachment to the filtering media, which are thereby left clear and open for the unimpeded flowing through of the purified liquid.

The asbestos also collects to itself those very minute impurities of like character which usually flow through the filtering medium and cloud the filtered liquid. The sugar making process may proceed in usual or other approved manner subsequent to the filtration.

The application of the purifying process to the manufacture of sugar from beets will be clear from the foregoing without further elaboration.

In the refining of raw sugar, our purification process is applicable both to the sugar and the syrup which are separated, usually centrifugally, from the magma.

In the case of the separated sugar, it is usually dissolved and then pumped or run to the defecating tanks, and then it is usually treated with acid and lime to gather and separate the impurities. The finely divided asbestos is preferably added to the solution in the defecating tank, either coincidently with, or prior or subsequent to, the liming and acidifying.

The impurities in the solution are acted upon in substantially the same way as in the juice, which has already been described in detail. The scum and mud, and if desired, or necessary, the entire solution, is filtered, or the scum is removed by some skimming action or its equivalent. The action of the asbestos is the same as already described both in gathering impurities to itself, and in maintaining the filters clear during the passing of the solution, and also in collecting the minute or cloudy impurities which ordinarily pass through the filters.

The syrup separated from the magma by the centrifugals is diluted with water in the usual manner to the desired density, and this solution is usually treated with the lime and acid, and the comminuted asbestos may be added to the solution coincidently with, or prior or subsequent to the lime and acid treatment. What has been said heretofore with reference to the action of the asbestos applies in the present instance and need not be repeated.

The qantity of the comminuted or otherwise finely divided asbestos to be used in the juice, solution or other liquid may vary within very wide limits. We have realized excellent results by using from one to five pounds of the asbestos per ton of sugar contained in the juice, solution or other liquid. It will be understood that this specification of proportions is directive and not restrictive, that the relative proportions may be widely varied, and that the most advantageous proportion for use in a particular case is ascertainable by practice, and is dependent largely upon the quality of asbestos used and the kind of liquid to be filtered.

It will be understood that departures may be made from the details of the invention as herein embodied and described within the scope of the appended claims without departing from the principles of the invention and without sacrificing its chief advantages.

What we claim is:—

1. The process of purifying liquids which comprises mixing with the liquid finely divided asbestos whereby the impurities in the liquid are caused to adhere to the finely divided asbestos and removing the asbestos with the impurities attached thereto from the liquid.

2. The process of purifying liquids which comprises mixing with the liquid finely divided asbestos whereby the impurities in the liquid are caused to adhere to the finely divided asbestos and filtering the mixture and thereby separating the purified liquid and the asbestos with the gathered impurities.

3. The process of purifying sugar carrying liquids which comprises mixing with the liquid finely divided asbestos whereby the impurities in the liquid are caused to adhere to the finely divided asbestos and removing the asbestos with the impurities attached thereto from the liquid.

4. The process of purifying sugar carrying liquids which comprises mixing with the liquid finely divided asbestos whereby the impurities in the liquid are caused to adhere to the finely divided asbestos and filtering the mixture and thereby separating the purified liquid and the asbestos with the gathered impurities.

5. The process of purifying liquids which comprises mixing with the liquid finely divided asbestos whereby the impurities in the liquid are caused to adhere to the finely divided asbestos and form therewith a scum and removing the scum from the liquid.

6. The process of purifying sugar carrying liquids which comprises mixing with the liquid finely divided asbestos whereby the impurities in the liquid are caused to adhere to the finely divided asbestos and form therewith a scum and removing the scum from the liquid.

7. The process of purifying sugar carrying liquids which comprises heating the liquid to coagulate the albuminoids, mixing thoroughly with the liquid a finely divided asbestos whereby the coagulated albuminoids are caused to adhere to the finely divided asbestos and then separating the purified liquid from the finely divided asbestos with the adherent albuminoids.

8. The process of purifying sugar carrying liquids which comprises heating the liquid to coagulate the albuminoids, mixing thoroughly with the liquid a finely divided asbestos whereby the coagulated albuminoids are caused to adhere to the finely divided asbestos and then filtering the mixture to separate the purified liquid from the finely divided asbestos with the adherent albuminoids.

9. The process of purifying sugar carrying liquids which comprises heating the liquid to coagulate the albuminoids, mixing thoroughly with the liquid a finely divided asbestos whereby the coagulated albuminoids are caused to adhere to the finely divided asbestos and to form a scum on the surface of the liquid and separating the scum and the purified liquid.

10. The process of purifying sugar carrying liquids which comprises heating the liquid to coagulate the albuminoids, treating the liquid to precipitate other impurities therein, mixing thoroughly with the liquid a finely divided asbestos whereby the coagulated albuminoids are caused to adhere to the finely divided asbestos and then separating the purified liquid from the finely divided asbestos with the adherent albuminoids, both in the form of scum and precipitate.

In testimony whereof, we have signed our names to this specification.

ADAM YOUNG BLOMELEY.
RALPH EDWIN HOMER BLOMELEY.

Witness:
L. L. MINOR.